(12) United States Patent
Izu et al.

(10) Patent No.: US 9,109,656 B2
(45) Date of Patent: Aug. 18, 2015

(54) TOOTHED POWER TRANSMISSION BELT

(75) Inventors: Yasuyuki Izu, Hyogo (JP); Masakuni Yoshida, Hyogo (JP); Hirofumi Okabe, Hyogo (JP)

(73) Assignee: Mitsuboshi Belting Ltd. (JP)

( * ) Notice: Subject to any disclaimer, the term of this patent is extended or adjusted under 35 U.S.C. 154(b) by 1743 days.

(21) Appl. No.: 12/214,690

(22) Filed: Jun. 20, 2008

(65) Prior Publication Data

US 2008/0318719 A1    Dec. 25, 2008

(30) Foreign Application Priority Data

Jun. 20, 2007 (JP) ................. 2007-162198
Mar. 17, 2008 (JP) ................. 2008-067632
Apr. 10, 2008 (JP) ................. 2008-102447

(51) Int. Cl.
  *F16G 1/00* (2006.01)
  *F16G 5/00* (2006.01)
  *F16G 9/00* (2006.01)
  *F16G 1/28* (2006.01)
  *F16G 5/20* (2006.01)

(52) U.S. Cl.
  CPC ..................... *F16G 1/28* (2013.01)

(58) Field of Classification Search
  CPC ............... F16G 1/28; F16G 5/06; F16G 5/20; B29D 29/08; D02G 3/447
  USPC ......... 474/101, 148, 204, 205, 250, 251, 260, 474/263, 265, 266, 267, 268
  See application file for complete search history.

(56) References Cited

U.S. PATENT DOCUMENTS

| 1,347,254 | A | * | 7/1920 | Dankmeyer | 139/426 R |
| 2,507,852 | A | * | 5/1950 | Case | 474/148 |
| 2,588,647 | A | * | 3/1952 | Mitchell | 83/171 |
| 2,631,463 | A | * | 3/1953 | Waugh | 474/260 |
| 2,739,090 | A | * | 3/1956 | Waugh | 474/260 |
| 3,547,764 | A | * | 12/1970 | Van Amerongen | 442/71 |
| 3,566,706 | A | * | 3/1971 | Fix | 474/265 |
| 3,616,164 | A | * | 10/1971 | Tanimoto et al. | 442/358 |
| 3,736,805 | A | * | 6/1973 | Dent | 474/250 |
| 3,800,610 | A | * | 4/1974 | Wach | 474/250 |
| 3,835,720 | A | * | 9/1974 | Fisher et al. | 474/250 |
| 3,937,094 | A | * | 2/1976 | Cicognani | 474/205 |
| 4,016,325 | A | * | 4/1977 | Flautt et al. | 442/188 |
| 4,276,039 | A | * | 6/1981 | Takano | 474/205 |
| 4,498,891 | A | * | 2/1985 | Mashimo et al. | 474/205 |
| 4,604,081 | A | * | 8/1986 | Mashimo et al. | 474/205 |

(Continued)

FOREIGN PATENT DOCUMENTS

JP    A-203249    9/2007

*Primary Examiner* — Henry Liu
(74) *Attorney, Agent, or Firm* — Wood, Phillips, Katz, Clark & Mortimer (57) ABSTRACT

A power transmission belt has a body with a length, a width, an inside and an outside. The body has at least one load carrying member embedded in rubber and extending in a lengthwise direction. The body defines a plurality of teeth spaced along the length of the belt on at least one of the inside and outside of the body. At least one of: (a) the at least one load carrying member has an occupying rate (R) that is not less than 75%, with $R=n \times Dc/B \times 100$ where: n=number of load carrying members aligned along the width of the body; Dc=diameter of load carrying member(s); and B=width of the body; and (b) the at least one load carrying member has a cross-sectional area taken transversely to the length of the body that is in a range of 1.10 to 1.70 mm² per 1 mm of belt width.

12 Claims, 1 Drawing Sheet

(56) References Cited

U.S. PATENT DOCUMENTS

| | | | | | |
|---|---|---|---|---|---|
| 4,617,075 | A | * | 10/1986 | Wetzel et al. | 156/137 |
| 4,642,082 | A | * | 2/1987 | Mashimo et al. | 474/260 |
| 4,652,252 | A | * | 3/1987 | Westhoff et al. | 474/204 |
| 4,662,863 | A | * | 5/1987 | Sloniewsky et al. | 474/251 |
| 4,681,558 | A | * | 7/1987 | Rausch | 474/205 |
| 4,787,200 | A | * | 11/1988 | Inada et al. | 57/242 |
| 4,832,673 | A | * | 5/1989 | Nagai et al. | 474/263 |
| 4,891,040 | A | * | 1/1990 | Nagai et al. | 474/267 |
| 5,120,280 | A | * | 6/1992 | Mizuno et al. | 474/260 |
| 5,164,241 | A | * | 11/1992 | Andre De La Porte et al. | 428/97 |
| 5,178,586 | A | * | 1/1993 | Mizuno et al. | 474/266 |
| 5,209,961 | A | * | 5/1993 | Yokoi | 428/161 |
| 5,230,667 | A | * | 7/1993 | Nakajima et al. | 474/263 |
| 5,234,387 | A | * | 8/1993 | Fujiwara et al. | 474/205 |
| 5,259,822 | A | * | 11/1993 | Nakanishi et al. | 474/263 |
| 5,268,221 | A | * | 12/1993 | Nakanishi et al. | 428/222 |
| 5,322,479 | A | * | 6/1994 | Le Devehat | 474/101 |
| 5,346,731 | A | * | 9/1994 | Nakanishi | 428/34.5 |
| 5,378,206 | A | * | 1/1995 | Mizuno et al. | 474/263 |
| 5,417,618 | A | * | 5/1995 | Osako et al. | 474/205 |
| 5,429,555 | A | * | 7/1995 | Beckh | 474/267 |
| 5,503,887 | A | * | 4/1996 | Diaz et al. | 428/58 |
| 5,545,097 | A | * | 8/1996 | Kitazumi et al. | 474/266 |
| 5,630,770 | A | * | 5/1997 | Fujiwara et al. | 417/326 |
| 5,802,839 | A | * | 9/1998 | Van Hook | 57/236 |
| 5,807,194 | A | * | 9/1998 | Knutson et al. | 474/268 |
| 6,159,121 | A | * | 12/2000 | Di Giacomo et al. | 474/205 |
| 6,296,588 | B1 | * | 10/2001 | Ciemniecki et al. | 474/268 |
| 7,056,249 | B1 | * | 6/2006 | Osako et al. | 474/260 |
| 2005/0143209 | A1 | * | 6/2005 | Shibutani | 474/260 |

* cited by examiner

TOOTHED POWER TRANSMISSION BELT

BACKGROUND OF THE INVENTION

1. Field of the Invention

This invention relates to power transmission belts and, more particularly, to a power transmission belt with pulley engaging teeth spaced along the length of the belt.

2. Background Art

It is known to make power transmission belts from rubber with teeth spaced at regular intervals along the length of the belt. These belts are commonly used in high load applications, as in association with engines and other driving/driven devices. It is also known to incorporate and embed in these belts load carrying members, that extend lengthwise of the belt. A cloth layer is commonly placed over a surface of the belt upon which the teeth are formed. Exemplary of such a construction is that shown in Gazette of Japanese Patent Laid-Open 2002/168,302.

In this type of toothed belt, high modulus properties are demanded to maintain engagement of the teeth with a complementarily-shaped and cooperating pulley, even under high load applications. To achieve this objective, it is known to make the cross-sectional area of the load carrying members relatively large. The load carrying members are often made for this high load application by twisting together a plurality of undertwisted cords that together produce the elongate load carrying member. These load carrying members have been made with high modulus fiber, such as glass fiber, carbon fiber, aramid fiber, and PBO fiber.

The use of twisted load carrying members that have a large diameter and that utilize high modulus fiber in a toothed belt has resulted in at least two notable problems. First of all, such belts are prone to having less than satisfactory bending fatigue characteristics. Secondly, these belts tend to experience an initial, potentially detrimental, increase in elongation that results by a tightening of the twisted components of the load carrying members upon running the belt under a high load.

Less than desired bending fatigue properties may cause the following results. Deterioration, resulting from bending increases as the bending repetitions of load carrying members, resulting from engagement with pulleys in operation, increases. This causes elongation of the load carrying members, as a result of which the tension in the belt may be detrimentally lowered. As this occurs, the belt may be prone to premature breakage in a manner by other than separation of the teeth.

As to the second problem, when the initial elongation due to tightening of the twisted components of the load carrying members under load becomes significant, lowering of belt tension in the initial running stages may likewise become significant. This may cause a change in tooth pitch and defects such as tooth cracking caused by uneven abrasion of a cloth layer over the teeth. This low tension condition may make these belts more prone to these defects than a similarly constructed belt operating under a higher, targeted tension.

Still further, a change in tension in the load carrying members due to initial elongation may cause a significant change in their diameters. This may lead to detachment of the load carrying members from the material in which they are embedded.

Both problems are related in a manner whereby attempting to solve one may aggravate the other. For example, by increasing the twisting number of the load carrying members to avoid compromising of the bending fatigue characteristics, the initial elongation may become detrimentally significant. On the other hand, when the twisting number is decreased in order to reduce initial elongation, bending fatigue properties may be worsened.

Heretofore, the industry has not devised a belt construction that adequately enhances durability and belt life by effectively addressing both of the above problems through the selection of thickness, twisting number, etc. of load carrying members.

SUMMARY OF THE INVENTION

In one form, a power transmission belt has a body with a length, a width between laterally spaced sides, an inside and an outside. The body includes at least one load carrying member embedded in rubber and extending in a lengthwise direction. The body defines a plurality of teeth spaced along the length of the belt on at least one of the inside and outside of the body, wherein at least one of: (a) the at least one load carrying member has an occupying rate (R) that is not less than 75%, with $R=n \times Dc/B \times 100$ where: n=number of load carrying members aligned along the width of the body; Dc=diameter of load carrying member(s); and B=width of the body; and (b) the at least one load carrying member has a cross-sectional area taken transversely to the length of the body that is in a range of 1.10 to 1.70 mm$^2$ per 1 mm of belt width.

In one form, the at least one of the inside and outside of the body and has a surface that is covered by a cloth layer.

In one form, the at least one load carrying member has a cross-sectional area, taken transversely to the length of the body, that is in a range of 1.10 to 1.70 mm$^2$ per 1 mm of belt width and the at least one load carrying member is made from chemical fiber.

In one form, the at least one load carrying member has an occupying rate (R) that is not less than 75%. The at least one load carrying member is made from a plurality of cords that are twisted together. A twist multiplier (K) for the plurality of cords, that are twisted together to define the at least one load carrying member, is in the range of $1.5 \leq K \leq 2.5$, with $K=T \times D^{1/2}/960$ where: T (times/m)=twist number for the load carrying member(s); and D (tex) is a thickness of the cords.

In one form, the at least one load carrying member has a cross-sectional area taken transversely to the length of the body that is in a range of 1.10 to 1.70 mm$^2$ per 1 mm of belt width. The at least one load carrying member is made from a plurality of cords that are twisted together and a twist multiplier (K) for the plurality of cords, that are twisted together to define the at least one load carrying member, is in the range of $1.5 \leq K \leq 2.5$, with $K=T \times D^{1/2}/960$ where: T (times/m)=twist number for the load carrying member(s); and D (tex) is a thickness of the cords.

In one form, the body has a cloth layer that: (a) has a first surface applied to the belt body and an oppositely facing second surface exposed to engage a cooperating pulley; and (b) is a multi-woven structure consisting of a warp and at least two different wefts that are interwoven. The warp is made from nylon fiber and at least one of the two different wefts exposed at the second surface is made from fluorine based fiber.

In one form, the weft fibers on the first surface are not made from fluorine based fibers.

In one form, the body has a first type of fiber that softens or melts at a temperature at which the body is vulcanized and is extended around the fluorine based fiber by at least one of: (a) twisting the first type of fiber and fluorine based fiber together; and (b) causing the first type of fiber to soften or melt and thereby form around part or all of the fluorine based fiber.

In one form, the first type of fiber is at least one of: (a) polyamide based fiber; (b) polyester based fiber; and (c) olefin based fiber.

In one form, the cloth layer is impregnated with a resorcinol-formalin-rubber latex treating solution to which: (a) an aqueous-dispersion of a sulfur compound; (b) at least one kind of vulcanizing aid selected from: (i) a quinone oxime based compound; (ii) a methacrylate based compound; and (iii) a maleimide based compound; or (c) a dispersion of the vulcanizing aid in water is added, dried and adhered to the teeth.

In one form, the teeth have a modulus upon 50% elongation that is at least 5 MPa.

In one form, there are a plurality of load carrying members. The load carrying members have a first diameter in an untensioned state. The distance between adjacent load carrying members in a widthwise direction is not greater than the first diameter.

DETAILED DESCRIPTION OF THE DRAWINGS

Figure 1:
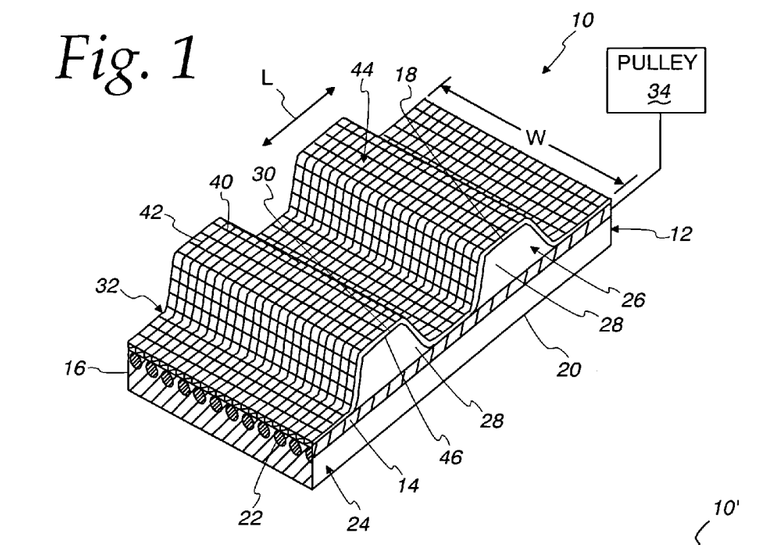
FIG. 1 is a fragmentary, perspective view of one form of toothed power transmission belt, made according to the present invention.

In FIG. 1, a toothed power transmission belt, made according to the present invention, is shown at 10. The power transmission belt 10 has a body 12 with a length, extending in the direction of the double-headed arrow L, and width W, between laterally spaced sides 14, 16. The body 12 has an inside 18 and an outside 20. The designations "inside" and "outside" are arbitrary as they could be reversed.

The body 12 is made from a rubber composition and includes at least one embedded load carrying member 22 extending in a lengthwise direction. The load carrying member(s) 22 may be a spirally wrapped single component or a plurality of components spaced laterally from each other. For purposes of explanation herein, the load carrying members 22 will be considered to be plural members, whether made from a single component with spaced turns or multiple, separate, laterally spaced components.

The belt body 12 is made with two different sections—a back section 24 in which the load carrying members 22 are embedded, and a toothed section 26. In the toothed section 26, a plurality of laterally extending teeth 28 are formed. The teeth 28 are trapezoidally shaped fully between the sides 14, 16 and are spaced at regular intervals along the belt length L.

The inside 18 of the belt 10 has a surface 30 that is covered by a cloth layer 32. Thus, the cloth layer is applied over the teeth 28.

Figure 2:
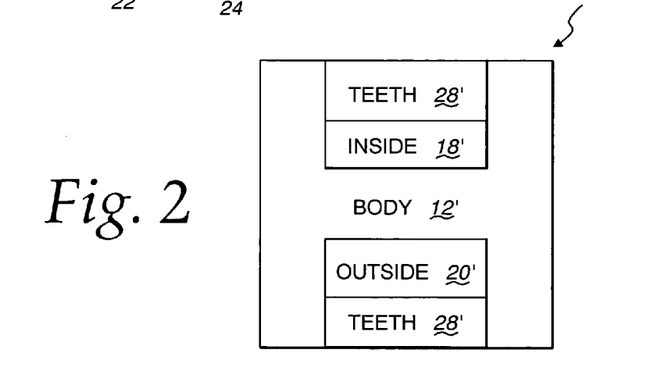
FIG. 2 is a schematic representation of a toothed power transmission belt, made according to the present invention.

While the belt 10 is shown with teeth 28 on only one of the inside and outside of the belt body 12, as shown in FIG. 2, it is contemplated that a toothed belt 10' might be made according to the invention with a body 12' having teeth 28' on both a corresponding inside 18' and outside 20' of a body 12'. The description herein below will be limited to the power transmission belt 10 shown in FIG. 1.

The rubber composition used for the belt body 12 is selected to have good resistance to deterioration at elevated temperatures. Exemplary rubbers suitable for this purpose are hydrogenated nitrile rubber (HNBR), chlorosulfonated polyethylene (CSM), alkylated chlorosulfonated polyethylene (ACSM) and chloroprene rubber.

It is preferred that the hardness of the rubber in which the teeth 28 are formed be in the range of 89° to 970 in terms of the JIS-A hardness. It is also preferred that the modulus be not less than 5 MPa at 50% elongation. A suitable high modulus rubber is a blended product of HNBR with a highly fine dispersion of zinc polymethacrylate in HNBR (such as "ZSC", a trademark used on a commercial product offered by Nippon Zeon) followed by reinforcement as through the addition of silica, carbon and/or short fibers. As a result, the modulus of the belt body 12 is enhanced to maintain engagement of the teeth 28 with a cooperating pulley 34, even under high load running conditions.

The load carrying members 22 in the back section 24 of the body 12 are embedded in the rubber and extend lengthwise in aligned relationship so that there is a consistent widthwise spacing between adjacent load carrying members 22.

Figure 3:
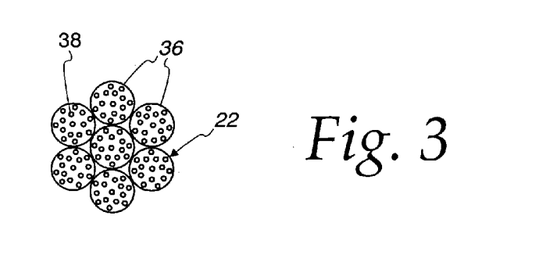
FIG. 3 is a cross-sectional view of a load carrying member on the power transmission belt of FIG. 1.

Each load carrying member 22, as seen in FIG. 3, has a twisted construction of large diameter made from undertwisted cords 36, in turn made from twisted chemical fiber 38. The chemical fiber 38 may be, for example, any of PBO (poly-p-phenylene benzobisoxazal) fiber, polyallylate fiber, aramid fiber, carbon fiber, etc.

Preferably, each load carrying member 22 has a cross-sectional diameter in the range of 1.10 to 1.70 mm$^2$ per 1 mm width of the belt body 12. More preferably, this range is 1.10 to 1.66 mm$^2$. However, since there are manufacturing variances and potentially variations resulting from imprecise measurement of the cross-sectional area, the upper limit may be 1.70 mm$^2$.

It has been found that when the cross-sectional area of the load carrying members 22 is maintained within this range, the problems mentioned previously, that result from initial elongation, are controlled, whereby there is no significant detrimental effect on bending fatigue characteristics or resulting from any tightening of the twisting of the load carrying members. Accordingly, a power transmission belt may be constructed that remains durable while operating under high loads.

It is further preferred to use a load carrying member 22 with a twist multiplier (K) for a plurality of cords 36 that is maintained in the range of 1.5≤K≤2.5, with K=T×D$^{1/2}$/960 where:

T (times/m)=twist number for the load carrying member(s); and

D (tex) is a thickness of the cords 36.

When the twist multiplier K for the load carrying member 22 is within this range, the aforementioned problems associated with initial elongation, notably compromising of bending fatigue characteristics and tightening of twists, can be controlled to the point that the resulting toothed belt remains adequately durable operating under high load conditions.

Generally, when the load carrying members 22 are closely aligned in the widthwise direction of the belt body 12, the belt modulus becomes high. It is preferred that an occupying rate (R) for the load carrying members 22 be not less than 75%, with R=n×Dc/B×100 where:

n=number of load carrying members 22 aligned along the width of the body 12;

Dc (mm)=diameter of load carrying member(s) 22; and

B (mm)=width of the body 12.

The characterization "diameter of the load carrying members" as used herein is intended to mean a diameter measured with the load carrying members 22 embedded in the belt body 12.

When the occupying rate R is maintained at not less than 75%, it is possible to make a toothed power transmission belt with a high modulus and one that is at the same time capable of maintaining engagement with a cooperating toothed pulley, even when operating under high loads.

It is also preferred that the distance/pitch between load carrying members 22 in the widthwise direction be not more than the diameter of the load carrying members 22 in an untensioned state. The designation "untensioned state" is intended to mean a state of the load carrying members 22 in which they are not embedded in the belt body 12 and there is minimal tension on the load carrying members 22. This can be quantified by characterizing this state as one wherein the tension is not more than 4.9 N (0.5 kgf). When the lateral spacing between load carrying members 22 is maintained as such, the load carrying members 22 are densely aligned in such a manner that the belt 10 may have an adequately high modulus.

The cloth layer 32 may be a fiber textile made by weaving of warps 40, extending widthwise of the belt body 12, and wefts 42, extending lengthwise of the belt body 12. The fiber textile may be plain textile, twilled textile, satin textile, etc. The fiber material making up the fiber textile may be, for example, aramid fiber, urethane elastic yarn, aliphatic fiber yarn (Nylon 6, Nylon 66, polyester, polyvinyl alcohol, etc.) and the like.

Preferably, the fiber textile is a multiple ply, multi-/double woven structure made up of at least two different kinds of wefts 42 and one kind of warp 40 that are woven together. It is preferred to use nylon fiber for the warp 40 and at least one of a fluorine based fiber, a nylon fiber, and a urethane elastic yarn for the wefts 42.

With respect to the weft 42 that is on the side 44 of the cloth layer 32 that is exposed directly to the pulley 34, it is preferred to use a fluorine based fiber, such as PTFE fiber, that accounts for a low coefficient of friction between the cloth layer 32 and the cooperating pulley 34.

The weft 42 exposed on the oppositely facing side 46 of the cloth layer 32, that is applied to the surface 30, is made preferably from fiber that is other than a fluorine based fiber. This fiber is selected so that the adhering forces between the cloth layer 32 and the rubber on the surface 30 is adequate. Suitable materials for the weft 42 are nylon fiber, urethane elastic yarn, etc.

In one preferred form, low melting point fiber, that melts or softens at a vulcanizing temperature for the rubber in the body 12, may be formed around the fluorine based fiber. More specifically, a fluorine based fiber and a low melting point fiber, as discussed above, may be twisted together. Alternatively, a fluorine based fiber may be covered by such a low melting point fiber, as a result of that fiber being melted or partially melted and thereby formed around part or all of the fluorine based fiber.

There is no particular limitation with respect to how vulcanization is carried out for the belt body 12, in terms of either temperature or time. The vulcanization process may be dictated by taking into consideration the type of vulcanizing agent or vulcanizing promoter, as well as the vulcanizing means, etc., and further by referring to a vulcanization curve usually measured by the use of a Mooney viscometer or other measuring device for the vulcanization process. Generally vulcanization is carried out with temperature maintained in the range of 100°-200° C. with a vulcanization time of one minute to five hours. Secondary vulcanization may be carried out, if necessary.

If the low melting point fiber that extends around the fluorine based fiber is one that softens or melts at the vulcanization temperature for the belt body, during vulcanization, the fiber flows into the gaps between the fibers making up the cloth layer 32, after which the low melting point fiber becomes crystallized. As a result, upon engagement of the cloth layer 32 with, or disengagement of the cloth 32 from, the pulley 34 during operation, cutting and scattering of the fluorine based fiber due to shock and abrasion at the exposed side 44 can be adequately limited. As a consequence, the body 12 remains protected for an acceptable use period and premature attachment of teeth 28 from the body 12 may be avoided. As a result, a belt with a long life may be produced, even if it is operated at high loads.

Suitable low melting point fibers are, for example, a polyamide based fiber, a polyester based fiber, or an olefin based fiber.

In the event that a polyamide based fiber is used, it is preferred that one be used which is copolymerized polyamide that is a combination of a ω-amino carboxylic acid component or a dicarboxylic acid component with a diamine.

In the event that a polyester based fiber is used, those with a composite core-sheath type of fiber are preferred. Examples of polyester polymers which are core components having a melting point higher than the vulcanization temperature of the belt body are polyethylene terephthalate, polybutylene terephthalate and a copolymer thereof.

Copolymerized polyester sheath components, having a melting point lower than the vulcanization temperature of the body, are produced by a polycondensation reaction of a dibasic acid with a diol. Examples thereof are those where terephthalic acid and diethylene glycol are bases with a copolymerizing component such as isophthalic acid, adipic acid, sebacic acid, diethylene glycol, butanediol, hexanediol, polyethylene glycol and neopentyle glycol. The melting point may be selected by changing the component combination and copolymerizing ratio thereof.

Examples of the olefin based fiber are polypropylene fiber and polyethylene fiber (such as high-density polyethylene fiber, medium-density polyethylene fiber, low-density polyethylene fiber, linear low-density polyethylene fiber and ultrahigh-molecular polyethylene fiber). Substances produced by copolymerization of the above substances may be used as well. Additionally, there is no particular limitation as to a twisting method or the fiber constitution, so long as the fiber is softened or melted at the vulcanization temperature for the belt body 12.

Additionally, a plasma treatment, or the like, may be carried out on the surface of the low melting point fiber to enhance the affinity thereof to an adhesive treating agent.

The cloth layer 32 may be adhered to the surface 30 through the following steps.

Step 1

The fiber textile making up the cloth layer 32 is impregnated with a resorcinol-formalin-rubber latex treating solution (hereinafter "RFL treating solution") and dried. It is preferred that an aqueous dispersion of a sulfur compound, at least one vulcanizing aid from amongst a quinone oxime based compound, a methacrylate based compound and a maleimide based compound, or a dispersion of such a vulcanizing aid in water, be added to the RFL treating solution.

For an aqueous dispersion of a sulfur compound, an aqueous dispersion of sulfur or tetramethylthiuram disulfide may be used. A suitable example of the quinine oxime based compound is p-quinone dioxime. Suitable examples of the methacrylate based compound are ethylene glycol dimethacrylate or trimethylolpropane trimethacrylate. Suitable examples of the maleimide based compound are N,N'-m-phenylenebismaleimide or N,N'-(4,4'-diphenyl-methanebismaleimide).

Water, in which the vulcanizing aid is dispersed, may contain some alcohol, such as methanol. The affinity of the vulcanizing aid to water is enhanced even when the vulcanizing aid is insoluble in water whereby the vulcanizing aid is apt to be dispersed.

If a vulcanizing aid is added to the RFL treating solution, the following effects may be expected. A chemical bond between layers of a rubber latex component and an outer layer rubber (this means: (a) a mucilage or rolled rubber formed by a mucilage through the treatment Step 2, below, or by a coating treatment of Step 3, below; or (b) rubber which makes up the teeth 28 when the coating treatment is omitted) contained in the RFL treating solution is enhanced. As a result, adhesive force is improved, minimizing the likelihood that the cloth layer 32 will detach from the surface 30.

It is further expected that the chemical bond (cross-linking force) of the rubber latex component contained in the RFL treating solution will be enhanced. As a result, detachment of the outer layer rubber noted above, due to breakage, takes place before detachment of any separate cushion rubber layer in which the load carrying members are embedded, due to cohesion failure, i.e., interlayer detachment.

In the event that a vulcanizing aid is added to the RFL treating solution, an impregnating treatment of the fiber textile may be carried out in two treatment steps. The above-mentioned vulcanizing aids are not added to the RFL treating solution in the first dipping treatment into the RFL treating solution. That is because in the first treating step, hardening of RF is to be carried out prior to cross-linking of the rubber latex component.

In the second RFL impregnating treating step, an RFL treating solution is used that contains more rubber latex component than the first RFL treating solution and is added to: (a) an aqueous dispersion of a sulfur compound; (b) at least one vulcanizing aid from amongst: (i) quinone oxime based compound; (ii) a methacrylate based compound; and (iii) a maleimide based compound; or (c) an aqueous dispersion of the vulcanizing aid in water.

The reason there are different amounts of rubber latex component in the RFL treating solution in the first and second impregnating treatment steps is to enhance the adhesive property of the RFL layer to both the fiber and rubber, that have different affinities.

Step 2

Two kinds of mucilage treatments (P1 and S1 treatment) are carried out in which the fiber textile is adhered with an adhesive treating agent, made up of mucilage wherein a rubber composition is dissolved in a solvent, and then subjected to a baking treatment.

Step 3

Mucilage and rolled rubber are coated onto the surface of the fiber textile in a coating treatment process. The mucilage and rolled rubber become coated upon the fiber textile and then to the underlying teeth 28.

In the event that a vulcanizing aid is added to the RFL treating solution, it is preferably the same vulcanizing aid as added to the rolled rubber and the mucilage used in the coating treatment. As a result, significant improvements may be expected in: (a) adhesion between the mucilage and the fiber textile treated with the RFL treating solution; (b) adhesion between the rolled rubber and fiber textile treated with the RFL treating solution; and (c) adhesion between the rolled rubber, mucilage and fiber textile treated with the RFL treating solution.

It is not necessary to conduct all of the above treatment steps. Preferably, at least one or two of these steps are performed. For example, when a vulcanizing aid is added to the RFL treating solution in the treatment Step 1, adhesion between the rubber and the fiber textile is considerably enhanced. Thus, the mucilage treatment in Step 2 may be omitted.

A durability test was conducted using a biaxial high-load running test to ascertain the benefits of the present invention.

The test conditions were as follows:

Tester: Biaxial high-load running tester;

Evaluated belt size: 130 H14M 20 (tooth number: 130; tooth type: H14M; belt width: 20 mm);

Tooth number of the driving pulley: 33;

Tooth number of the driven pulley: 61;

Set tension: 550 N;

Speed: 1,200 rpm; and

Load: Any of 626 Nm (running condition 1); 554 Nm (running condition 2); and 480 Nm (running condition 3) on the driven pulley.

The rubber composition, constitution of the load carrying members, and cloth layer constitution used in the durability tests are shown in Tables 1, 2 and 3, respectively.

TABLE 1

Rubber Composition

| Rubber Composition | R-0 | R-1 | R-2 |
|---|---|---|---|
| HNBR *1 | 50 | 50 | 50 |
| Composite Polymer of Metal Unsaturated Carboxylate with HNBR *2 | 50 | 50 | 50 |
| Aromatic Amide Fiber *3 | 0 | 5 | 10 |
| Plasticizer *4 | 5 | 5 | 5 |
| Stearic Acid | 1 | 1 | 1 |
| Zinc Oxide | 5 | 5 | 5 |
| Silica *5 | 25 | 50 | 50 |
| Anti-Aging Agent *6 | 1 | 1 | 1 |
| Vulcanizing Aid *7 | 2 | 2 | 2 |
| Organic Peroxide *8 | 2 | 2 | 2 |
| Hardness (JIS-A) | 89 | 94 | 96 |
| MSO (Modulus uon 50% Elongation) (unit: MPa) | 5.0 | 8.0 | 11.0 |

*1: "Zetpol 2020" manufactured by Nippon Zeon

*2: "ZSC 2295 N" manufactured by Nippon Zeon

*3: "Cornex Short Fiber" manufactured by Teijin

*4: "Adeka Sizer RS 700" manufactured by Asahi Denka

*5: "Ultrasil VN 3" manufactured by Degussa Japan

*6: "Nocrac MBO" manufactured by Ouch Shinko Kagaku

*7: "San Ester TMP" manufactured by Sanshin Kagaku Kogyo

*8: 40 wt % of 1,3-Bis(tert-butylperoxyisopropyl)benzene and 60 wt % of calcium carbonate

TABLE 2

Load Carrying Member Constitution

|  | G-0 | A-1 | A-2 | A-3 | A-4 | A-5 | C-1 |
|---|---|---|---|---|---|---|---|
| Fiber Material | Glass | Aramid | Aramid | Aramid | Aramid | Aramid | Carbon Fiber |
| Under Yarn Size (unit: tex) | 33.7 | 167 | 167 | 167 | 167 | 167 | 800 |
| Consitution | 9/17 | 1/24 | 1/24 | 1/20 | 1/18 | 3/6 | 4/0 |
| Twist Multiplier (K) | 3.0 | 1.5 | 2.5 | 2.5 | 2.0 | 2.0 | 2.4 |

TABLE 3

Cloth Layer Constitution

|  | F-1 | F-2 | F-3 | F-4 | F-5 |
|---|---|---|---|---|---|
| Twisted Constitution | 2/2 Twilled | Weft: 2 colors, double woven; Front: 1/3 Twilled; Back: 2/2 Twilled | Weft: 2 colors, double woven; Front: 1/3 Twilled; Back: 2/2 Twilled | Weft: 2 colors, double woven; Front: 1/3 Twilled; Back: 2/2 Twilled | Weft: 2 colors, double woven; Front: 1/3 Twilled; Back: 2/2 Twilled |
| Warp | Nylon 66 | Nylon 66 | Nylon 66 | Nylon 66 | Nylon 66 |
| Weft-1 | Nylon 66; Urethane Elastic Yarn | PTFE Fiber *1; Urethane Elastic Yarn | PTFE Fiber *1; Polyester based fiber *2; Urethane Elastic Yarn | PTFE Fiber *1; Polyamide based fiber *3; Urethane Elastic Yarn | PTFE Fiber *1; Olefin based fiber *4; Urethane Elastic Yarn |
| Weft-2 |  | Nylon 66; Urethane Elastic Yarn | Nylon 66; Urethane Elastic Yarn | Nylon 66; Urethane Elastic Yarn | Nylon 66; Urethane Elastic Yarn |

*1: PTFE fiber: Toyoflon 1330 dtex manufactured by Toray
*2: Polyester based fiber: "Cornetta" manufactured by Unitika
*3: Polyamide based fiber: "Flor M" manufactured by Unitika
*4: Olefin based fiber: "Dainima" manufactured by Toyobo As shown in Table 3, the weft of F-2 is made with PTFE fiber, which is a fluorine based fiber. With the F-3, F-4 and F-5 cloth layers, in addition to the PTFE fiber, low melting point fiber that softened or melted at the rubber vulcanizing temperature, i.e., polyester based fiber, polyamide based fiber and olefin based fiber, were respectively incorporated. The rubber of the belts used in this test was vulcanized at a temperature of 165° C. for 30 minutes. With the polyester based fiber ("Cornetta" manufactured by Unitika), the melting point of the core was 256° C. and that of the sheath was 160° C. In the polyamide based fiber ("Flor M" manufactured by Unitika), the melting point was 135° C. In the olefin based fiber ("Dainima" manufactured by Toyobo), the melting point was 140° C.

The compositions of the RFL treating solution, the mucilage treatment (P1 treatment and S1 treatment) and rubber for the coating treatment for the cloth layer adhesive treatment are shown in Tables 4, 5 and 6, respectively.

TABLE 4

RFL Composition

|  | B-1 | B-2 |
|---|---|---|
| HNBR Latex (40 wt %) *1 | 100 | 100 |
| RF Condensate (20 wt %) *2 | 50 | 25 |
| Aqueous Solution of NaOH (10 wt %) |  | 2 |
| Dispersion of Maleimide based compound (50 wt %) |  | 20 |
| Water | 110 | 100 |

*1: Latex manufactured by Nippon Zeon
*2: Molar ratio of R/F = 1/1.5 (for B-1, it is 1/1)

TABLE 5

Composition for PT Treatment (treatment with mucilage containing isocyanate); and composition for S1 Treatment (treatment with mucilage)

| Composition | Mucilage for P1 | Mucilage for S1 |
|---|---|---|
| Composition for HNBR Mucilage | 5 | 15 |
| Polymeric MDI | 5 |  |
| MEK | 90 | 85 |

TABLE 6

Composition of Rubber for Coating Treatment

| Composition of Rubber | C-1 | C-2 |
|---|---|---|
| HNBR *1 | 100 |  |
| HNBR *2 |  | 50 |
| HNBR *3 |  | 50 |
| Zinc Oxide | 2 | 2 |
| Magnesium Oxide | 4 |  |
| Stearic Acid | 1 | 1 |
| Silica |  | 50 |
| Carbon Black | 50 | 0 |
| Anti-Aging Agent | 2 | 2 |
| Vulcanizing Aid *4 | 2 | 2 |
| Organic Peroxide *5 | 2 | 2 |
| Plasticizer (Polyether Type) | 5 | 10 |

*1: "Zetpol 2020" manufactured by Nippon Zeon
*2: "Zetpol 2010L" manufactured by Nippon Zeon
*3: "ZSC 2295 N" manufactured by Nippon Zeon
*4: "Maleimide based compound
*5: 40 wt % of 1.3-bis(tert-butylperoxyisopropyl)benzene and 60 wt % of calcium carbonate In Tables 1 to 6, the units are wt % and the oblique lines in Tables 4-6 indicate that there is no addition or no treatment unless otherwise mentioned.

Fourteen kinds of belts, made with rubber compositions, load carrying member constitution, tooth cloth layer constitution and using tooth cloth layer adhesive treatments, as set out in Tables 1 to 6, were subjected to a durability test under the above-mentioned test conditions. The results are shown in Tables 7 and 8, below.

TABLE 7

Test Result (1)

| Evaluated Belt | TG-1 Comparative Example | TG-2 Inventive Example | TG-3 Inventive Example | TG-4 Inventive Example | TG-5 Inventive Example | TG-6 Inventive Example | TG-7 Inventive Example |
|---|---|---|---|---|---|---|---|
| Rubber Composition | R-0 | R-0 | R-0 | R-0 | R-0 | R-1 | R-1 |
| Load Carrying Member | G-0 | G-0 | A-1 | A-2 | A-3 | A-3 | A-3 |
| Cloth Layer Adhering Treatment for Toothed Belt | F-1 | F-3 | F-1 | F-1 | F-1 | F-2 | F-2 |
| RFL (first step) | B-1 | B-1 | B-1 | B-1 | B-1 | | |
| RFL (second step) | | B-2 | | | | | |
| P1 Treatment | conducted or adopted | conducted or adopted | conducted or adopted | conducted or adopted | conducted or adopted | conducted or adopted | not conducted/ not adopted |
| S1 Treatment | conducted or adopted | conducted or adopted | conducted or adopted | conducted or adopted | conducted or adopted | conducted or adopted | not conducted/ not adopted |
| Coating Treatment | C-1 | C-1 | C-1 | C-1 | C-1 | C-1 | C-1 |
| Initial Molding | not conducted/ not adopted | not conducted/ not adopted | not conducted/ not adopted | not conducted/ not adopted | not conducted/ not adopted | not conducted/ not adopted | conducted or adopted |
| Load Carrying Member Pitch (mm) | 2.87 | 2.87 | 2.95 | 2.95 | 2.85 | 2.8 | 2.4 |
| Load Carrying Member Diameter (without tension) (mm) | 2.45 | 2.45 | 3.01 | 2.83 | 2.55 | 2.55 | 2.55 |
| Load Carrying Member Diameter (in a belt) (mm) | 1.92 | 2.01 | 2.20 | 2.24 | 2.09 | 2.00 | 2.25 |
| Width of Belt (mm) | 20 | 20 | 20 | 20 | 20 | 20 | 20 |
| Cross Section of Load Carrying Member (mm$^2$/load carrying member) | 2.9 | 3.16 | 3.81 | 3.92 | 3.36 | 3.78 | 3.78 |
| (mm$^2$/mm belt) | 1.01 | 1.10 | 1.29 | 1.33 | 1.16 | 1.12 | 1.66 |
| Occupying Rate of Load Carrying Member (%) | 58 | 60 | 86 | 67 | 63 | 70 | 90 |
| Effective Load Carrying Member Number | 6 | 6 | 6 | 6 | 6 | 7 | 8 |
| Load Carrying Member Diameter (in belt) × Effective Load Carrying Member | 11.5 | 12.0 | 13.2 | 13.4 | 12.5 | 14.0 | 18.0 |
| Life under Running Condition 1 (hours) | | | | | | 35 | |
| Life under Running Condition 2 (hours) | | | | | | 205 | 480 |
| Life under Running Condition 3 (hours) | 30 | 322 | 177 | 120 | 222 | 734 | |

TABLE 8

Test Result (2)

| Evaluated Belt | TG-8 Comparative Example | TG-9 Inventive Example | TG-10 Inventive Example | TG-11 Inventive Example | TG-12 Inventive Example | TG-13 Inventive Example | TG-14 Inventive Example |
|---|---|---|---|---|---|---|---|
| Rubber Composition | R-1 | R-1 | R-1 | R-1 | R-2 | R-2 | R-2 |
| Load Carrying Member | A-3 | A-3 | A-3 | A-3 | A-4 | A-5 | C-1 |
| Cloth Layer Adhering Treatment for Toothed Belt | F-2 | F-4 | F-5 | F-3 | F-3 | F-3 | F-3 |
| RFL (first step) | B-1 | B-1 | B-1 | B-1 | B-1 | B-1 | B-1 |
| RFL (second step) | B-2 | B-2 | B-2 | B-2 | B-2 | B-2 | B-2 |
| P1 Treatment | not conducted | not conducted | not conducted | not conducted | not conducted | not conducted | not conducted |
| S1 Treatment | not conducted | not conducted | not conducted | not conducted | not conducted | not conducted | not conducted |
| Coating Treatment | C-2 | C-2 | C-2 | C-2 | C-2 | C-2 | C-2 |
| Initial Molding | adopted | adopted | adopted | adopted | adopted | adopted | adopted |
| Load Carrying Member Pitch (mm) | 2.3 | 2.3 | 2.3 | 2.3 | 2.3 | 2.3 | 2.3 |

TABLE 8-continued

Test Result (2)

| Evaluated Belt | TG-8 Comparative Example | TG-9 Inventive Example | TG-10 Inventive Example | TG-11 Inventive Example | TG-12 Inventive Example | TG-13 Inventive Example | TG-14 Inventive Example |
|---|---|---|---|---|---|---|---|
| Load Carrying Member Diameter (without tension) (mm) | 2.55 | 2.55 | 2.55 | 2.55 | 2.40 | 2.45 | 2.10 |
| Load Carrying Member Diameter (in a belt) (mm) | 2.10 | 2.15 | 2.11 | 2.19 | 2.03 | 2.05 | 1.88 |
| Width of Belt (mm) | 20 | 20 | 20 | 20 | 20 | 20 | 20 |
| Cross Section of Load Carrying Member (mm$^2$/load carrying member) | 3.46 | 3.63 | 3.50 | 3.77 | 3.24 | 3.30 | 2.78 |
| (mm$^2$/mm belt) | 1.51 | 1.58 | 1.52 | 1.64 | 1.41 | 1.44 | 1.21 |
| Occupying Rate of Load Carrying Member (%) | 84 | 86 | 84 | 88 | 81 | 82 | 75 |
| Effective Load Carrying Member Number | 8 | 8 | 8 | 8 | 8 | 8 | 8 |
| Load Carrying Member Diameter (in belt) × Effective Load Carrying Member | 16.8 | 17.2 | 16.9 | 17.5 | 16.2 | 16.4 | 15.0 |
| Life under Running Condition 1 (hours) | 155 | 256 | 320 | 289 | 970 | 1250 | 1850 |
| Life under Running Condition 2 (hours) | 550 | | | | | | |
| Life under Running Condition 3 (hours) | | | | | | | |

Belts TG-1 to TG-5 showed relatively low durability among the 14 kinds of belts (TG-1 to TG-14) based on the low-load testing (running condition 3). Test results under high load (running conditions 1 and 2) are omitted. On the other hand, belts TG-8 to TG-14 showed relatively high durability as a result of a high-load testing (running condition 1 or 2). Test results under lower load (running condition 2 or 3) are omitted.

As seen in Tables 7 and 8, characteristics for the load carrying members such as pitch, cross section and occupying rate, were different for the 14 kinds of belts.

The cross sections of the load carrying members per mm width of the belts in Tables 7 and 8 were calculated by the following formula.

Load carrying member cross section per 1 mm belt width (mm$^2$/mm) belt)=(belt width (mm)/load carrying member pitch (mm))×load carrying member cross section per load carrying member (mm$^2$/core wire numbers) belt width (mm)=load carrying member cross section per load carrying member (mm$^2$/load carrying member number)/load carrying member pitch (mm$^2$).

To determine the load carrying member cross section per load carrying member (mm$^2$/load carrying member numbers), the load carrying member cross section is calculated from an SEM image analysis of the belt section (tooth head) and then averaged based upon the total load carrying member number (n). To determine the load carrying member pitch (mm), the distance between load carrying member centers of a belt section is measured at ten places and then averaged. However, in the event the belt width is narrow and measurement at ten places is not possible, measurement at five places, followed by averaging, is carried out. The distance between load carrying member centers was measured using known devices such as an SEM and a projector.

Load carrying member occupying rate (R) (%) is calculated by the following formula.

Load carrying member occupying rate(%)=effective load carrying member number($n$)×load carrying member diameter($Dc$)(mm)÷belt width($B$)(mm)× 100.

The effective load carrying member number (n) is the number of load carrying members aligned in the width direction of the belt. In Tables 7 and 8, the belt width (B) is divided by load carrying member pitch. All numbers after the decimal point are omitted.

In Tables 7 and 8, the term "Initial Molding" is used to identify whether or not an "initial molding method" was adopted in the step for the manufacture of a belt. The "initial molding method" is a method where, after the cloth layer and teeth are first/initially molded using a mold having a toothed profile, unvulcanized rubber containing the load carrying members and the back sections are wrapped around the mold. Thereafter, this subassembly is vulcanized using a vulcanizing can. In this initial molding method, since the cloth layer and teeth are molded before vulcanization, it is not necessary upon vulcanization to flow the unvulcanized rubber, making up the back section, into/through the space between the load carrying members. Therefore, it is possible to make the distance between the load carrying members (pitch) narrow. Accordingly, as previously mentioned, this initial molding method is suitable for preparation of a high modulus belt where the pitch is relatively small, i.e., not larger than the load carrying cord diameter in an untensioned state (belts TG-7 to TG-14 in Table 7).

As shown in Tables 7 and 8, for belt TG-1 of the Comparative Example, where the cross section of the load carrying member per 1 mm of the belt is small (<1.10), belt trouble resulted within about 30 hours even under the running condition 3 where the load is the lowest. Thus, durability was considerably low. On the contrary, in the case of belts TG-2 to TG-5, where the load carrying member cross section is more than that of the belt TG-1 and the twist multiplier of the load carrying member is within a range of 1.5≤K≤2.5 (refer to Table 2), not less than a four times longer life was achieved under the same running condition 3 and, therefore, the durability was shown to be improved.

In the belts TG-2 and TG-6 to TG-14, where different tooth cloths (tooth cloth (F-2 to F-5) as a multi-woven structure with warp and two different kinds of weft) from the tooth cloths of the belts T-1 and TG-3 to TG-5 were used, it can be seen that, under the running condition 1 or 2 with higher load, life of not shorter than 200 hours was achieved, evidencing better durability than belts TG-1 and TG-3 to TG-5.

In belts TG-9 to TG-11, although conditions thereof other than tooth cloth are nearly the same as those of TG-8, life of not less than 1.6 times was achieved under the high load running condition 1. That is because, in belt TG-8, a tooth cloth F-2, using no low melting point fiber in the weft was used while, in belts TG-9 to TG-11, low melting point fiber such as polyester based fiber, polyamide based fiber or olefin based fiber were used in the weft (refer to Table 2). Thus, it is likely that, when a low melting point fiber is provided around the fluorine based fiber (PTFE fiber) of the weft, cutting and scattering of the fluorine based fiber are suppressed and the rubber of the belt body is able to be protected for a long period of time.

Further, with the belts TG-8 to TG-14, RFL treatment upon adhesion of the tooth cloth is conducted in two steps. Moreover, a vulcanizing aid is added in the RFL treating solution during the second step. It is likely that, as a result, adhesive forces of the tooth cloth increase and there is an enhanced durability, as compared with the belts TG-6 and TG-7, which are not subjected to such a treatment.

Furthermore, for belts TG-7 to TG-14, an initial molding method was adopted during manufacture. As a result, the load carrying member pitch becomes smaller than it is with the load carrying cords in the untensioned state. As such, as compared with the belts TG-1 to TG-6, load carrying members are densely aligned in the width direction of the belt, whereby the load carrying member occupying rate (R) is high (not less than 75%) and modulus is likewise high and, accordingly, it is expected that the durability will thereby be enhanced.

Still further, in TG-13 where A-5 is adopted as a load carrying member constitution, running life under the running condition 1 is longer than TG-12 where A-4 is adopted. That is because, in the load carrying member constitution of A-5, maintenance of tension is good and tension rises in the treatment of the load carrying member whereby the initial elongation by tightening the twisting is limited and detachment of teeth resulting from elongation of the belt may be limited.

The foregoing disclosure of specific embodiments is intended to be illustrative of the broad concepts comprehended by the invention.

The invention claimed is:

1. A power transmission belt comprising:
a body having a length, a width between laterally spaced sides, an inside and an outside,
the body comprising rubber and including at least one embedded load carrying member extending in a lengthwise direction,
the body defining a plurality of teeth spaced along the length of the belt on at least one of the inside and outside of the body,
wherein:
(a) the at least one load carrying member has an occupying rate (R) that is not less than 75% with R=n×Dc/B×100 where:
n=number of load carrying members aligned along the width of the body;
Dc=diameter of load carrying member(s); and
B=width of the body; and
(b) the at least one load carrying member has a cross-sectional area taken transversely to the length of the body that is in a range of 1.10 to 1.70 mm² per 1 mm of belt width,
wherein the at least one load carrying member comprises a plurality of cords that are twisted together and a twist multiplier (K) for the plurality of cords that are twisted together to define the at least one load carrying member is in the range of 1.5≤K≤2.5 with K=T×D$^{1/2}$/960 where:
T (times/m)=twist number for the load carrying member(s); and
D (tex) is a thickness of the cords,
wherein the at least one of the inside and outside of the body has a surface that is covered by a cloth layer,
wherein the cloth layer: (a) has a first surface applied to the belt body and an oppositely facing second surface exposed to engage a cooperating pulley; and (b) comprises a multi-woven structure comprising a warp and at least two different wefts that are interwoven, wherein the warp comprises nylon fiber and at least one of the two different wefts exposed at the second surface comprises fluorine based fiber.

2. The power transmission belt according to claim 1 wherein the at least one load carrying member comprises chemical fiber.

3. The power transmission belt according to claim 1 wherein the weft fibers on the first surface do not comprise fluorine based fibers.

4. A power transmission belt comprising:
a body having a length, a width between laterally spaced sides, an inside and an outside,
the body comprising rubber and including at least one embedded load carrying member extending in a lengthwise direction,
the body defining a plurality of teeth spaced along the length of the belt on at least one of the inside and outside of the body,
wherein:
(a) the at least one load carrying member has an occupying rate (R) that is not less than 75% with R=n×Dc/B×100 where:
n=number of load carrying members aligned along the width of the body;
Dc=diameter of load carrying member(s); and
B=width of the body; and
(b) the at least one load carrying member has a cross-sectional area taken transversely to the length of the body that is in a range of 1.10 to 1.70 mm² per 1 mm of belt width,
wherein the at least one load carrying member comprises a plurality of cords that are twisted together and a twist multiplier (K) for the plurality of cords that are twisted together to define the at least one load carrying member is in the range of 1.5≤K≤2.5 with K=T×D$^{1/2}$/960 where:
T (times/m)=twist number for the load carrying member(s); and
D (tex) is a thickness of the cords,
wherein the at least one of the inside and outside of the body has a surface that is covered by a cloth layer,
wherein the cloth layer: (a) has a first surface applied to the belt body and an oppositely facing second surface exposed to engage a cooperating pulley; and (b) comprises a multi-woven structure comprising a warp and at least two different wefts that are interwoven, wherein the warp comprises nylon fiber and at least one of the two different wefts exposed at the second surface comprises fluorine based fiber, wherein a first type of fiber that softens or melts at a temperature at which the body is vulcanized is extended around the fluorine based fiber by at least one of (a) twisting the first type of fiber and fluorine based fiber together; and (b) causing the first type of fiber to soften or melt and thereby form around part or all of the fluorine based fiber.

5. The power transmission belt according to claim 4 wherein the first type of fiber comprises at least one of: (a) polyamide based fiber; (b) polyester based fiber; and (c) olefin based fiber.

6. The power transmission belt according to claim 1 wherein the cloth layer is impregnated with a resorcinol-formalin-rubber latex treating solution to which: (a) an aqueous-dispersion of a sulfur compound; (b) at least one kind of vulcanizing aid selected from: (i) a quinone oxime based compound; (ii) a methacrylate based compound; and (iii) a maleimide based compound; or (c) a dispersion of the vulcanizing aid in water is added, dried and adhered to the teeth.

7. The power transmission belt according to claim 4 wherein the cloth layer is impregnated with a resorcinol-formalin-rubber latex treating solution to which: (a) an aqueous-dispersion of a sulfur compound; (b) at least one kind of vulcanizing aid selected from: (i) a quinone oxime based compound; (ii) a methacrylate based compound; and (iii) a maleimide based compound; or (c) a dispersion of the vulcanizing aid in water is added, dried and adhered to the teeth.

8. The power transmission belt according to claim 5 wherein the cloth layer is impregnated with a resorcinol-formalin-rubber latex treating solution to which: (a) an aqueous-dispersion of a sulfur compound; (b) at least one kind of vulcanizing aid selected from: (i) a quinone oxime based compound; (ii) a methacrylate based compound; and (iii) a maleimide based compound; or (c) a dispersion of the vulcanizing aid in water is added, dried and adhered to the teeth.

9. A power transmission belt comprising:
a body having a length, a width between laterally spaced sides, an inside and an outside,
the body comprising rubber and including at least one embedded load carrying member extending in a lengthwise direction,
the body defining a plurality of teeth spaced along the length of the belt on at least one of the inside and outside of the body,
wherein:
(a) the at least one load carrying member has an occupying rate (R) that is not less than 75% with $R = n \times Dc/B \times 100$ where:
n=number of load carrying members aligned along the width of the body;
Dc=diameter of load carrying member(s); and
B=width of the body; and
(b) the at least one load carrying member has a cross-sectional area taken transversely to the length of the body that is in a range of 1.10 to 1.70 mm$^2$ per 1 mm of belt width,
wherein the at least one load carrying member comprises a plurality of cords that are twisted together and a twist multiplier (K) for the plurality of cords that are twisted together to define the at least one load carrying member is in the range of $1.5 \leq K \leq 2.5$ with $K = T \times D^{1/2}/960$ where:
T (times/m)=twist number for the load carrying member(s); and
D (tex) is a thickness of the cords,
wherein the at least one of the inside and outside of the body has a surface that is covered by a cloth layer,
wherein the teeth have a modulus upon 50% elongation that is at least 5 MPa.

10. The power transmission belt according to claim 1 wherein there are a plurality of load carrying members, the load carrying members have a first diameter in an untensioned state and a distance between adjacent load carrying members in a widthwise direction is not greater than the first diameter.

11. The power transmission belt according to claim 1 wherein the two different wefts have a different composition.

12. A power transmission belt comprising:
a body having a length, a width between laterally spaced sides, an inside and an outside,
the body comprising rubber and including at least one embedded load carrying member extending in a lengthwise direction,
the body defining a plurality of teeth spaced along the length of the belt on at least one of the inside and outside of the body,
wherein:
(a) the at least one load carrying member has an occupying rate (R) that is not less than 75% with $R = n \times Dc/B \times 100$ where:
n=number of load carrying members aligned along the width of the body;
Dc=diameter of load carrying member(s); and
B=width of the body; and
(b) the at least one load carrying member has a cross-sectional area taken transversely to the length of the body that is in a range of 1.10 to 1.70 mm$^2$ per 1 mm of belt width,
wherein the at least one load carrying member comprises a plurality of cords that are twisted together and a twist multiplier (K) for the plurality of cords that are twisted together to define the at least one load carrying member is in the range of $1.5 \leq K \leq 2.5$ with $K = T \times D^{1/2}/960$ where:
T (times/m)=twist number for the load carrying member(s); and
D (tex) is a thickness of the cords,
wherein the at least one of the inside and outside of the body has a surface that is covered by a cloth layer,
wherein the cloth layer: (a) has a first surface applied to the belt body and an oppositely facing second surface exposed to engage a cooperating pulley; and (b) comprises a warp and weft, wherein the weft exposed at the second surface comprises fluorine based fiber,
wherein a first type of fiber that softens or melts at a temperature at which the body is vulcanized is extended around the fluorine based fiber by at least one of (a) twisting the first type of fiber and fluorine based fiber together; and (b) causing the first type of fiber to soften or melt and thereby form around part or all of the fluorine based fiber.

* * * * *